Aug. 12, 1952   H. M. HENION   2,606,726
AIRCRAFT LANDING GEAR CONSTRUCTION
Filed July 13, 1949   2 SHEETS—SHEET 2
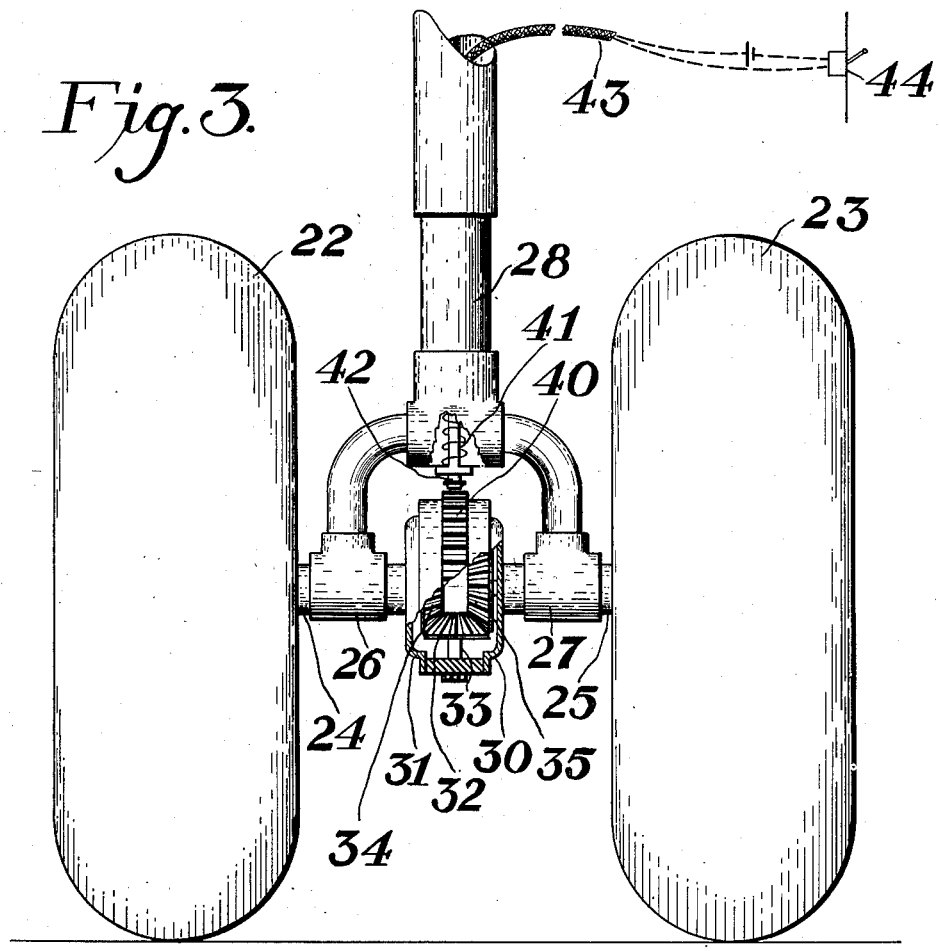
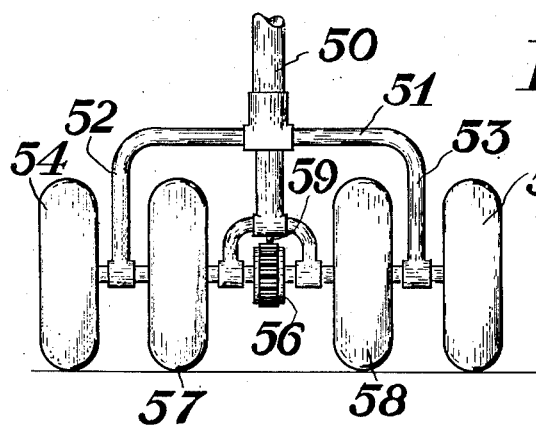
HENRY M. HENION INVENTOR.
BY
J. Allen Jones Patented Aug. 12, 1952

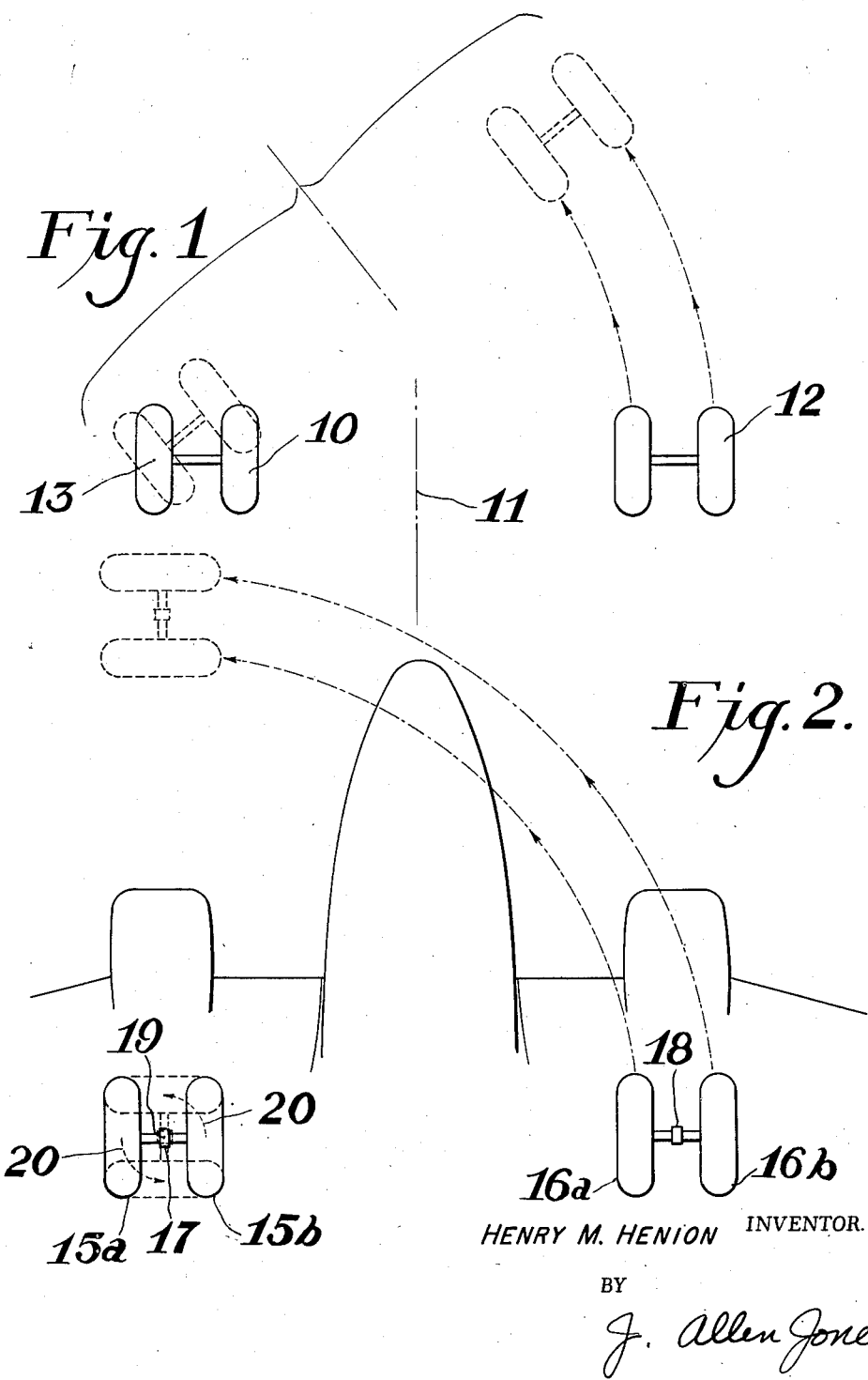

2,606,726

UNITED STATES PATENT OFFICE 2,606,726

AIRCRAFT LANDING GEAR CONSTRUCTION

Henry M. Henion, Washington, D. C.

Application July 13, 1949, Serial No. 104,399

4 Claims. (Cl. 244—103)

This invention relates to aircraft landing gear, and is particularly concerned with means for facilitating turning of the aircraft when on the ground, and for avoiding the excessive wear which takes place on tires and airport surfaces when aircraft are turned while on the ground.

The invention is particularly applicable to landing gear constructions in which the landing gear comprises four or more wheels mounted two or more together on each side of the longitudinal center line of the aircraft.

An important object of the invention is the provision of landing gear structure which eliminates the excessive wear on tires and runway surfaces which occur when aircraft having landing gears of the type referred to above are turned, such as when they make a turn onto or off of the runway before taking off or after landing, or when they are swung around into loading or unloading position relative to the passenger or freight handling facilities.

Another object of the invention is to provide an improved landing gear structure which facilitates handling of the plane on the ground.

A further object of the invention is to provide an improved aircraft landing gear construction having the advantages set forth above, and also being simple in construction and maintenance, and relatively inexpensive. It is also advantageous that the improved construction which I have invented can be applied to existing aircraft structures without radical modifications thereof.

These and other objects of the invention will be apparent from the following specification when taken in conjunction with the accompanying drawings, in which:

Fig. 1 is a diagrammatic view taken from above or below, and showing the manner in which aircraft having four wheeled landing gears made turns prior to my invention;

Fig. 2 is a view similar to Fig. 1, but showing the manner in which a turn is made in an aircraft embodying my invention;

Fig. 3 is a front elevational view of one pair of the wheels of an aircraft as shown in Fig. 2, and embodying my invention, portions of the structure being cut away for greater clarity; and Fig. 4 is a view similar to Fig. 3, but showing the application of the invention to aircraft having four wheels on each side of the center line of the aircraft.

Referring now to the drawings, Fig. 1 shows the manner in which turns were made by aircraft prior to this invention. This figure shows the conventional landing gear arrangement in which there are a pair of wheels 10 on the left side of the center line 11 of an aircraft, and another pair of wheels 12 on the right side of the center line. In turning the aircraft on the ground, the pilot conventionally applies the brake on the wheel on the side in the direction in which the turn is to be made, and as shown in Fig. 1, the pilot has applied the brake on the leftmost of the wheels 10, and by speeding up one or more motors on the right side of the aircraft, he is able to swing the aircraft from the position in which the wheels 10 and 12 are in their solid line positions, to a position in which the wheels are in the broken line position. In making this turn, the aircraft pivots about a point 13 which would represent the point of contact of the left wheel of the pair of wheels 10 with the runway.

The turning of the aircraft about the pivot point 13 is accomplished by a forcible twisting of this left wheel of the pair 10 and a scraping contact with the surface upon which the aircraft is resting. In the larger planes now in use, this scraping is said to abrade about a dollar's worth of rubber off of the tire for each turn that is made, and in the case of asphalt runways, considerable damage is often done to the runway surface. In addition to the abrading of the rubber of the tire, and the surface of the runway, there is a large strain imposed upon the undercarriage of the aircraft during such turns, and this extra strain must be taken into consideration in designing the undercarriage structure.

A very small number of airports in the United States have provided means for facilitating the turning of aircraft by placing small turntables flush with the runway at the points where turns are most frequently made, such as in front of the passenger and freight loading facilities. However, these turntables are quite expensive, and they are often rendered unusuable by snow and ice in the winter. There is also a waste of time in steering the aircraft onto these small turntables, as very careful handling of the aircraft is required.

In Figure 2 I have shown the manner in which an aircraft utilizing my invention is able to make a turn on the ground, and in this figure, considering the view as being taken from above, we see a left-hand pair of wheels 15a and 15b, and a right-hand pair of wheels 16a and 16b. Each pair of wheels is provided with a differential arrangement 17 which is shown in greater detail in Fig. 3, and which will be explained in detail presently. By the use of this differential arrangement, the aircraft, in making a turn to the left while on the ground, and moving from the solid line position to the broken line position, turns about a pivot point 19, located between the two wheels 15a and 15b. If a turn where made to the right, the pivot point would be similarly located between wheels 16a and 16b.

In making a turn to the left, as shown in Fig. 2, the differential arrangement 17 permits wheel 15a to turn backwardly, while wheel 15b turns forwardly, and as a result, these wheels move in the manner of the arrows 20, and inasmuch as the movement of the aircraft is accompanied by rotation of the wheels, the undesirable results of abrasion, as set forth above, are avoided completely. Turning now to a detailed description of the arrangement which makes possible the type of turn shown in Fig. 2, reference is made to Fig. 3, wherein is shown a pair of wheels which may be considered either wheels 15a, 15b, or wheels 16a, 16b. The arrangement will be identical on each side of the aircraft. The two wheels shown in Fig. 3 are given reference numerals 22 and 23 in order to avoid confusion, and these wheels are fixed, respectively, on a pair of axles 24 and 25, these axles being rotatably mounted in bearing arrangements 26 and 27 provided at the lower end of the strut or other structure 28 by which the aircraft is supported on the wheels. This strut 28 is shown as being in the shape of an inverted Y, and except for slight differences which will appear from the description, the strut need not be different from the struts ordinarily in use.

Between the two inner ends of the axles 24 and 25 there is located a connecting device, such as a differential arrangement of any design, as denoted by the reference numeral 30. As shown, the casing 31 or other cage structure of the differential arrangement carries a pair of planetary bevel gears, one of which is shown at 32, these gears being rotatable on shafts 33 mounted in the casing. Each of the axles 24 and 25 carries a bevel gear as shown, respectively, at 34 and 35, and these bevel gears mesh with the bevel gears 32 carried by the casing.

The two gears 34 and 35, and consequently the wheels 22 and 23, are free to rotate in the same direction, as long as the casing or cage 31 of the differential arrangement is free to rotate. However, if the casing 31 is held against rotation, the wheels 22 and 23 will no longer be able to rotate in the same direction, but will be permitted to rotate in opposite directions, and at the same speed.

In order to permit turning of the aircraft on the ground in the manner shown in Fig. 2 of the drawings, the differential casing is locked against rotation by any suitable means, and upon being locked in this manner, the wheels 22 and 23 are permitted to rotate only in opposite directions, thus permitting the type of turn explained above with regard to Fig. 2.

There is shown in Fig. 3 a simple means for locking the differential casing 31 against rotation. The casing is preferably made circular in configuration when viewed in an axial direction, and notches 40 are disposed about the periphery of the casing 31. The strut 28 is provided with any convenient means for engaging the notches 40, and as shown in Fig. 3, the means provided for locking the differential casing 31 against rotation comprise an electro-magnet 41 having a movable core 42 which may be projected into engagement with the notches 40 upon energization of the electro-magnet. A spring or other means may be provided for withdrawing the core 42 upon de-energization of the electro-magnet 41. The electro-magnet may be controlled in any suitable manner, and as diagrammatically shown in Fig. 3, it may be controlled by wiring 43 running to a switch 44 located, for example, on the instrument panel of the aircraft.

While the wiring 43 is shown as running through the strut 28, it can be mounted in any convenient manner, and there will be no interference with the oleo or other shock absorbing means used in the aircraft undercarriage.

If desired, any other type of lock actuating means may be used, for example, a manual control for the pin 42 may be provided through a flexible cable arrangement, or hydraulically operated means may be used for operating the pin 42.

In operation, if the pilot desires to turn the aircraft to the left while on the ground, he merely throws switch 44 or such other means as are provided for locking the differential casing 31 against rotation, and upon speeding up the motors on the other side of the aircraft, a turn will be made in the manner of Fig. 2, with the pivot point being directly below the differential 30. Wheel 23 will turn forwardly and wheel 22 will turn to the rear. The differential on the right hand pair of wheels is left free to rotate, so that the wheels on the right will both rotate forwardly.

In turning to the right, the differential on the left is permitted to rotate, and the differential on the right is locked against rotation.

It should be apparent that the braking arrangement (not shown) which is provided on the aircraft will operate in a conventional manner, regardless of the presence of the differential arrangement described above, and the conventional brakes are applied to the right-hand wheels when a turn to the left is completed, in the ordinary manner.

In Fig. 4, I have shown the invention as applied to aircraft of the type having four wheels on each side of the center line of the aircraft, these wheels being carried by a strut 50. In this case, the wheels are mounted on a fork-like arrangement 51 provided at the lower end of the strut 50, and the outermost portions 52 and 53 pass between the outer pairs of wheels. The outer wheels 54 and 55 remain freely rotatable in either direction at all times, their mounting being independent of the differential arrangement which is shown at 56 between the two center wheels 57 and 58. The arrangement between wheels 57 and 58 is the same as is shown in Fig. 3, and the differential casing 56 may be locked against rotation by a projection 59.

In this embodiment, when the projection 59 is disengaged from the differential casing 56, wheels 57 and 58 will be free to rotate together forwardly, wheels 54 and 55 being freely rotatable in either direction at all times, as mentioned above. When a turn is to be made on the ground, the turn being to the left, and the structure shown in Fig. 4 being considered as the left undercarriage of the aircraft, the pin 59 is engaged with the differential casing 56 is any suitable manner, for instance, as shown in Fig. 3, whereupon wheels 57 and 58 can only rotate in opposite directions. A turn is then made in the manner explained above with reference to Fig. 3. Of course, the differential on the right undercarriage is left freely rotatable when a turn is being made to the left, in accordance with the explanation set forth above in connection with Fig. 3.

I wish it to be understood that this invention is capable of numerous embodiments, such as by the use of various types of wheel supports, various types of strut arrangements, various types of differential gear arrangement, and various devices for locking the differential casing against rotation. Locking devices which could be used would include brake bands and other friction devices, as well as positive locking means as shown in the drawings. The pin 42 can be operated in any suitable manner without departing from the inventive concept. In applying the invention to even larger undercarriages than those shown in Fig. 4, only the two innermost wheels need be connected to the differential, and all of the outer wheels can be left free to rotate in any direction.

While I have described the invention particularly with reference to the use of a differential device, such as differential gearing, connecting each pair of wheels, any type of connecting element can be used between the wheels, as long as the connecting device is operable, selectively, to permit both wheels to rotate in the same direction, and to permit both wheels of a pair to rotate only in opposite directions.

In view of the fact that numerous variations of the invention can be made without departing from the broad inventive concept, the scope of the invention is to be limited only by the appended claims.

I claim:

1. In aircraft landing gear of the type having at least one pair of wheels on each side of the center line of the aircraft, an arrangement for facilitating handling of the aircraft on the ground, comprising means for independently and rotatably mounting the two wheels of each pair, a coupling device cooperating with the two wheels of each pair providing, selectively, for rotation of both wheels in the same direction, and for rotation of both wheels only in opposite directions, said coupling device comprising differential gearing housed in a casing, and means for controlling said coupling device and comprising retaining means movable into and out of engagement with said casing.

2. In aircraft landing gear of the type having at least one pair of wheels on each side of the center line of the aircraft, an arrangement for facilitating handling of the aircraft on the ground, comprising means for independently and rotatably mounting the two wheels of each pair, a coupling device cooperating with the two wheels of each pair providing, selectively, for rotation of both wheels in the same direction, and for rotation of both wheels only in opposite directions, said coupling device comprising differential gearing housed in a casing, and means for controlling said coupling device and comprising retaining means movable into and out of engagement with said casing, and electromagnetic actuating means for said retaining means.

3. Aircraft landing gear of the type having at least one pair of wheels on each side of the centerline of the aircraft, comprising, on each side of the centerline, wheel carrying strut means, a pair of axially aligned wheel shafts carried by each strut means for independent rotation, differential gearing between said shafts and including a gear wheel on each shaft, a gear casing, and gears carried by the casing and meshing with each of said shaft-carried gear wheels, and remotely operable control means for said gear casing, whereby the wheels of a pair can rotate in the same direction when said gear casing is free to rotate, and said wheels can rotate only in opposite directions when said casing is held against rotation by said control means, said strut means being bifurcated at its lower end and engaging said shafts on opposite sides of said gear casing.

4. Aircraft landing gear of the type having at least one pair of wheels on each side of the centerline of the aircraft, comprising, on each side of the centerline, wheel carrying strut means, a pair of axially aligned wheel shafts carried by each strut means for independent rotation, differential gearing between said shafts and including a gear wheel on each shaft, a gear casing, and gears carried by the casing and meshing with each of said shaft-carried gear wheels, and remotely operable control means for said gear casing, whereby the wheels of a pair can rotate in the same direction when said gear casing is free to rotate, and said wheels can rotate only in opposite directions when said casing is held against rotation by said control means, additional wheels carried by said strut means coaxially with said pair of wheels, said additional wheels being more remote from said differential than said pair of wheels, and being freely and independently rotatable at all times, and portions of said strut means extending between the wheels of the pair and said additional wheels for supporting said additional wheels.

HENRY M. HENION.

REFERENCES CITED

The following references are of record in the file of this patent:

UNITED STATES PATENTS

| Number | Name | Date |
|---|---|---|
| 907,847 | Molesworth et al. | Dec. 29, 1908 |
| 2,460,387 | Hunter | Feb. 1, 1949 |

FOREIGN PATENTS

| Number | Country | Date |
|---|---|---|
| 509,574 | Great Britain | July 18, 1939 |